United States Patent [19]

Gupta

[11] Patent Number: 5,001,215

[45] Date of Patent: Mar. 19, 1991

[54] AROMATIC POLYESTER FROM 1,3-BIS(P-CARBOXYPHENOXY)PROPANE

[75] Inventor: Balaram Gupta, North Plainfield, N.J.

[73] Assignee: Hoechst Celanese Corp., Somerville, N.J.

[21] Appl. No.: 430,555

[22] Filed: Nov. 2, 1989

[51] Int. Cl.$^5$ .................... C08G 63/00; C08G 67/00; C08G 69/00

[52] U.S. Cl. .................................. 528/271; 528/176

[58] Field of Search .............................. 528/176, 271

[56] References Cited

U.S. PATENT DOCUMENTS

| | | | |
|---|---|---|---|
| 4,296,232 | 10/1981 | Maresca | 528/179 |
| 4,711,911 | 12/1987 | Blount | 528/176 |
| 4,757,128 | 7/1988 | Domb et al. | 528/271 |
| 4,769,437 | 9/1988 | Blount | 528/95 |
| 4,845,179 | 7/1989 | Towle et al. | 528/9 |

FOREIGN PATENT DOCUMENTS 549667  11/1956  Belgium .

OTHER PUBLICATIONS

J. E. McIntyre et al., *Polymer:* 30 (Apr. 1989), 732–738.
A. Fradet et al., *Makromol. Chem.* 88, 1233–1251, (1987).
K. W. Leong et al., *Macramolecules,* 20(4), 705–712.

*Primary Examiner*—Harold D. Anderson
*Assistant Examiner*—T. Mosley
*Attorney, Agent, or Firm*—Marvin Turken

[57] ABSTRACT

A process is described for producing shapable aromatic polyesters derived from 1,3-bis(p-carboxyphenoxy)propane (CPP) and a dihydric phenol comprising forming a mixed anhydride of CPP with a lower monocarboxylic acid containing at least 2 carbon atoms, e.g., acetic acid, and subsequently polymerizing said mixed anhydride with said dihydric phenol or a reactable diester of said dihydric phenol, to obtain said aromatic polyester. The process is capable of producing aromatic polyesters as described having a glass transition temperature of at least about 70° C.

12 Claims, No Drawings

AROMATIC POLYESTER FROM 1,3-BIS(P-CARBOXYPHENOXY)PROPANE

BACKGROUND OF THE INVENTION

1. Field of the Invention

The invention relates to a novel process for the production of aromatic polyesters utilizing mixed anhydrides as intermediates, and to certain novel aromatic polyesters produced thereby.

2. Description of Related Art

The following information is disclosed in accordance with the terms of 37 CFR 1.56, 1.97 and 1.98.

J. E. McIntyre et al., *Polymer*: 30 (April 1989), 732–738, disclose polyesters of 4,4,'-hexamethylenedioxy-bis-benzoic acid and chlorohydroquinone.

U.S. Pat. No. 4,296,232 issued Oct. 20, 1981 to Maresca et al. discloses the preparation of polyarylates, i.e., aromatic polyesters, by reacting a diester of a dihydric phenol, e.g., bisphenol A, with an aromatic dicarboxylic acid, in the presence of a diphenyl ether compound and a magnesium catalyst.

A. Fradet et al., *Makromol. Chem.* 88, 1233–1251 (1987) disclose thermotropic polyesters of terephthalic acid and 4,4,'-alkylenediphenols.

Belgian Patent No. 549,667, published Nov. 16, 1956, C.A. 52:5033 g (1958) disCloses a process for the preparation of polyethylene terphathalate (PET) comprising the steps of forming a mixed anhydride of terephthalic and acetic acids, heating the latter mixed anhydride as a solution in 1-methylnaphthalene to distill off acetic acid and acetic anhydride and obtain a polymeric mixed anhydride containing 96% of terephthalic moieties, and reacting the latter polymeric anhydride with ethylene glycol in the presence of antimony trioxide to obtain PET.

K. W. Leong et al., "Synthesis of Polyanhydrides: Melt-Polycondensation, Dehydrochlorination and Dehydrative Coupling" published in *Macromolecules*, 20(4), 705–712, (April, 1987), disclose a variety of polyanhydrides including copolyanhydrides of bis(carboxyphenoxy)alkanes with sebacic acid.

K. W. Leong et al., "Polyanhydrides for Controlled Release of Bioactive Agents," published in *Biomaterials* 1986, Vol. 7, September, 364–371, disclose the use of various polyanhydrides including copolyanhydrides of bis(carboxyphenoxy)alkanes with sebacic acid, as controlled release agents for drugs in the form of polymer matrices containing the drug.

Pending application Ser. No. 370;929 filed June 23, 1989 by Gupta et al., discloses and claims a process for producing aromatic polyesters comprising forming a mixed anhydride of isophthalic and/or terephthalic acid with acetic acid and subsequently reacting the mixed anhydride with bisphenol A.

SUMMARY OF THE INVENTION

In accordance with this invention, an aromatic polyester or polyarylate capable of being formed into shaped articles and derived from 1,3-bis(p-carboxyphenoxy)propane (CPP) and a dihydric phenol, e.g., bisphenol A, is prepared by a process comprising the steps of initially forming a mixed anhydride of the CPP and a lower monocarboxylic acid containing at least 2 carbon atoms, e.g., acetic acid, and subsequently reacting the mixed anhydride with said dihydric phenol or a reactable diester of said dihydric phenol to obtain the aromatic polyester.

The inventive process may be carried out at a relatively low temperature resulting in less sublimation of CPP from the reaction zone (which must then be recovered), and the formation of higher yields of polymer having a higher glass transition temperature and a lighter color, when compared with a process which does not include the initial formation and resolution of the mixed anhydride.

DESCRIPTION OF PREFERRED EMBODIMENTS

The dihydric phenol contains two hydroxy groups bonded to aromatic ring carbon atoms. The aromatic ring carbon atoms bonded to hydroxy groups may be, for example, part of a single benzene or naphthalene ring system or they may be part of different benzene ring systems. The remaining carbon atoms making up the aromatic ring or rings containing the hydroxy groups may be bonded to hydrogen atoms or to various substituents such as lower alkyl, lower alkoxy, chloro, phenyl, and phenethyl. If the hydroxy groups are bonded to carbon atoms in different aromatic ring systems, such systems may be directly linked or linked through various aliphatic groups such as alkylene, ether, sulfone or ketone. Examples of specific dihydric phenols which may be used are as follows:

2,2-bis(4-hydroxyphenyl)propane also known as bisphenol A,
monocyclic dihydric phenols such as hydroquinone and resorcinol,
biphenols such as 4-4,'biphenol and 3,4,'-biphenol,
2-(4-hydroxyphenyl)-2-(3-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
bis(4-hydroxy-3-methylphenyl)methane,
bis(4-hydroxy-3,5-dichlorophenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane
2,2-bis(2-isopropyl-4-hydroxyphenyl)propane
2,2-bis(4-hydroxy-3-methylphenyl)propane,
2,2-bis(4-hydroxy-3-chlorophenyl)propane,
2,2-bis(4-hydroxy-3,5-dichlorophenyl)propane,
1,1-bis(4-hydroxyphenyl)-n-butane,
2,2-bis(4-hydroxyphenyl)pentane
3,3-bis(4-hydroxyphenyl)pentane
2,2-bis(4-hydroxyphenyl)heptane
1,2-bis(4-hydroxyphenyl)-1,2-bis-(phenyl)-propane,
4,4,'-dihydroxy-diphenyl ether,
bis(4-hydroxy-2-methylphenyl) ether,
bis(4-hydroxy-3-chlorophenyl) ether,
bis(4-hydroxyphenyl) sulfide,
bis(4-hydroxyphenyl) sulfone,
bis(4-hydroxyphenyl) ketone,
bis(4-hydroxyphenyl) sulfoxide The preferred dihydric phenol is bisphenol A.

In some instances, it may be advantageous to use, in place of the free dihydric phenol, a reactable diester of the dihydric phenol, e.g., with the same or different lower monocarboxylic acid, such as acetic acid, as that used to form the CPP mixed anhydride. Note that if a free dihydric phenol is used in the polymerization, the by-product is the free monocarboxylic acid forming the mixed anhydride with CPP. However, if a diester of the dihydric phenol is used in the polymerization, then the by-product is the anhydride of the acid forming the mixed anhydride with CPP and the acid forming the diester of the dihydric phenol, e.g., acetic anhydride if the acid is acetic acid in both cases.

The lower monocarboxylic acid used to prepare the mixed anhydride with CPP is preferably an alkanoic acid containing 2 to 4 carbon atoms, either unsubstituted or with at least one hydrogen atom substituted with chlorine, fluorine or a combination of the two. Examples of monocarboxylic acids which can be used for this purpose are acetic acid, trifluoroacetic acid, trichloroacetic acid, difluoroacetic acid, dichloracetic acid, fluoroacetic acid, chloroacetic acid, propionic acid, and n-butyric acid. The preferred monocarboxylic acids are acetic acid and trifluoroacetic acid, and most preferred is acetic acid.

The mixed anhydride may be formed, for example, by dissolving the CPP in excess monocarboxylic acid anhydride in an inert atmosphere such that the solution contains, for example, about 5 to 20 wt.% of CPP, and heating the solution at total reflux for a period adequate to liberate monocarboxylic acid and form the desired mixed anhydride, e.g., about 10 to 30 min. The mixed anhydride is then separated from the reaction mass by conventional methods, e.g., filtration and/or evaporation. In general, the formation of the mixed anhydride is carried out under such conditions that the degree of oligomerization ($d_o$), i.e., the average number of CPP anhydride moities per molecule is within the range of 1 to about 10, preferably about 1 to about 3.

After the formation of the mixed anhydride of the CPP and lower monocarboxylic acid in the initial step of the inventive process, it is reacted with the dihydric phenol or its reactable diester in an amount stoichiometrically equivalent to the CPP in the presence of a polymerization catalyst to obtain the aromatic polyester. The polymerization reaction may be carried out for example, at an initial temperature of about 180° C. to a final temperature of about 250° to 330° C. and a pressure of about 0.5 to 1.0 mm. Hg for a total heating period of about 3 to 4 hours. In general, the polymerization is initiated by raising the temperature while reducing the pressure by evacuation to remove free monocarboxylic acid or anhydride by-product until a fairly high vacuum is reached and a polymeric product having the desired properties, e.g., of glass transition temperature, is obtained.

The second or polymerization step of the process may, if desired, be carried out in the presence of an acidic, neutral or basic esterification catalyst, such classifications being based on the reaction of a conventional acid-base indicator and the catalyst when the latter is dissolved in a polar ionizing solvent such as water. If a catalyst is employed, it is preferably basic.

Suitable basic catalysts include the alkali metals, such as lithium, sodium, potassium, rubidium, and cesium, in elemental (metallic) form or as compounds such as hydroxides, hydrides, borohydrides, basic salts such as carbonates, phenates, bisphenates, (i.e. salts of a phenol or bisphenol), and carboxylates such as acetate or benzoate, and oxides of the foregoing alkali metals. Group II and III elements can also be used in place of the alkali metals of the foregoing classes of compounds such as metals and compounds of calcium, magnesium and aluminum. Other bases include trialkyl or triaryl tin hydroxides, acetates, phenates, and the like.

Suitable acid catalysts include transition metal salts of strong inorganic acids, while suitable neutral catalysts include transition metal salts of aliphatic carboxylic acids, e.g., acetic acid. The preferred transition metals making up the foregoing catalysts are Group VII and VIII metals, e.g. cobalt.

Examples of specific catalysts are lithium, sodium, potassium, rubidium, and cesium metals, potassium or rubidium carbonate, lithium hydroxide, potassium hydroxide, lithium hydride, sodium borohydride, potassium borohydride, lithium acetate, potassium acetate, calcium acetate, magnesium acetate, cobalt acetate, aluminum triisopropoxide and triphenyl tin hydroxide. Combinations of the foregoing catalysts may be used. The catalyst may be present in a catalytically effective amount in the range, for example, of about 0.005 to 2%, preferably about 0.01 to 1% by weight, based on the combined weight of CPP and dihydric phenol reactants.

If desired, a solvent may be used in both steps of the process, or only the second step. The solvent may be, for example, a non-polar hydrocarbon or chlorinated hydrocarbon, e.g., a polyaromatic hydrocarbon and/or ether such as Dowtherm A (A eutectic mixture of diphenyl and diphenyl ether) or 1,1-dihydric(orthoxylyl)ethane known as DXE, or chlorinated polyaromatic hydrocarbons and/or ethers such as Therminol 66 or Therminol 77 and the like.

The process of this invention can be used to produce aromatic polyesters having a glass transition temperature ($T_g$) of at least about 70° C., preferably about 90° to 220° C., and a melting point ($T_m$) when present, of about 200° to 300° C. both measured by differential scanning calorimetry (DSC; 20° C./min heating rate), and a thermal decomposition onset under nitrogen atmosphere by thermogravimetric analysis (TGA; 20° C./min heating rate) of about 300° to 450°.C. These polymers can generally be formed into shaped articles such as fibers, films and molded articles.

The following examples further illustrate the invention.

EXAMPLE 1

This example illustrates the preparation of an aromatic polyester of CPP and bisphenol A by first forming a mixed anhydride of CPP and acetic acid and subsequently polymerizing the mixed anhydride with bisphenol A.

In a 3 liter three-necked flask fitted with a mechanical stirrer, a condenser, and a gas inlet tube were placed freshly purified CPP powder (120 g, 0.38 mole) and 1.5 liter of analytical grade acetic anhydride (Aldrich). A slow stream of dry argon was bubbled through the mixture which was refluxed. After 20 minutes almost all the dibasic acid was dissolved. The hot mixture was filtered (about 20% of the unreacted CPP was recovered) in an argon swept dry box, and the filtrate was evaporated in a rotovap at no higher than 60° C. under vacuum to dryness which gave a-white syrupy mass. The residue was stored in a refrigerator overnight. White needle-like crystals formed were isolated by filtration, washed with dry ether, and transferred to a r.b. flask containing 600 ml dry diethyl ether and allowed to stir for 2-3 hours in a dry box to remove any traces of acetic acid or acetic anhydride. The white crystals of mixed anhydride were separated by filtration and dried in a $P_2O_5$ desiccator under vacuum, yield 42.5 g (56%). The melting point ($T_m$) was 104.5° C. (by DSC); GPC analysis $M_w=640$, $M_n=611$ and MWD=1.0, degree of oligomerization $d_o=1.65$; and IR—1804, 1725 cm$_{-1}$ characteristic for aromatic-aliphatic mixed anhydride bonds.

The foregoing mixed anhydride of CPP and acetic acid in an amount of 8.72 g (24 mmol) was transferred to a polymerization flask equipped with a mechanical stirrer and a vacuum distillation set-up, and was continuously purged with argon. Prepurified bisphenol A in an amount of 5.52 g (24 mmol) and 0.05 g of potassium acetate were then added to the mixed anhydride. The mixture was then heated to 180° C. in a pre-heated oil bath, and simultaneously vacuum was applied (0.5–1.0 mm Hg). The mixture melted within a few minutes and acetic acid started to condense. The oil bath temperature was slowly increased to 320° C. in about 3 hours and maintained a that temperature for about 20 minutes to ensure complete polymerization. The cooling of the flask to room temperature gave almost white glassy polyester of CPP and bisphenol A. The product was isolated by breaking the flask, yield 7.57 g. The condensate (1.58 g) was found to be acetic acid by IR. The glass transition temperature ($T_g$) of the polymer was found to be 98° C. and showed no distinctive endotherm as measured by differential scanning calorimetry (DSC; 20° C./min heating rate). The thermal decomposition onset under nitrogen atmosphere was found to be 393° C. by thermogravimetric analysis (TGA; 20° C./min heating rate). The infrared spectrum of the polymer showed no residual anhydride absorptions and showed strong ester absorptions at 1730 cm$^{-1}$.

EXAMPLE 2

This example illustrates the inventive process wherein the formation of the mixed anhydride and the polymerization of the latter with a dihydric phenol are carried out consecutively in the same reactor.

The procedure of Example 1 was followed using 6.32 grams (20 mmol) of CPP and 60 ml of acetic anhydride, to form a CPP-acetic mixed anhydride. After distilling-off the excess acetic anhydride and acetic acid, 4.6 grams (20 mmol) of bisphenol A and 0.05 grams of potassium acetate was introduced into the flask under constant purge of argon. Polymerization was carried out as described in Example 1 to yield 5.6 grams of polymer. The IR of the polymer was similar to that obtained in Example 1. The glass transition temperature ($T_g$) was 74° C., and the melting point was 228° C. as determined by DSC. The thermal decomposition onset as measured by TGA was 354° C.

Examples 3 and 4 demonstrate that the polymerizations can also be carried out in the absence of any catalyst.

EXAMPLE 3

The procedure of Example 1 was followed except for using 8.72 grams (24 mmol) of CPP mixed anhydride and 4.6 grams (20 mmol) of bisphenol A. The final polymerization temperature was 275° C., and the yield of the off-white polymer was 9.0 grams. The $T_g$ and $T_m$ were found to be 98° C. and 288° C. respectively as determined by DSC, and the decomposition onset was found to be 309° C. under nitrogen atmosphere as measured by TGA.

EXAMPLE 4

The procedure of Example 1 was followed except for using 4.6 grams (20 mmol) of bisphenol A. The final polymerization temperature was 280° C., and the yield of the off-white polymer was 8.4 grams. The $T_g$ and $T_m$ were found to be 91° C. and 290° C. respectively as determined by DSC, and the decomposition onset was found to be 413° C. under nitrogen atmosphere as measured by TGA.

EXAMPLE 5

This example illustrates the inventive process using a mixed anhydride of CPP and trifluoroacetic acid in the formation of an aromatic polyester.

The procedure of Example 1 was followed except that 6.32 grams (20 mmol) of CPP and 60 ml of trifluoroacetic anhydride was reacted to form the mixed anhydride in the first step. After distilling off the excess anhydride and trifluoroacetic acid, 4.6 grams (20 mmol) of bisphenol A and 0.05 grams of potassium acetate were added to the flask, and the heating was resumed. The final polymerization temperature was 270° C., and the yield of the pale yellow glassy polymer was 6.8 grams. The $T_g$ was found to be 83 C. and the polymer showed no melting point as determined by DSC. The decomposition onset was found to be 382° C. under nitrogen atmosphere as measured by TGA.

EXAMPLE 6

This example illustrates the inventive process using 4,4,'-biphenol as the dihydric phenol.

The procedure of Example 1 was followed except that 4.46 grams (24 mmol) of 4,4,'-biphenol instead of bisphenol A were polymerized with the mixed anhydride. The final polymerization temperature was 320° C., and the yield of the off-white polymer was 5.5 grams. The $T_g$ was found to be 208° C. as determined by DSC, and the polymer showed no melting point. The decomposition onset was found to be 382° C. under nitrogen atmosphere as measured by TGA.

EXAMPLE 7

This example illustrates the inventive process using a diacetate of a dihydric phenol rather than the free phenol.

The procedure of Example 1 was followed except that the polymerization was carried out using 1.05 grams (2.9 mmol) of CPP mixed anhydride and 0.78 grams (2.9 mmol) of 4,4,'-diacetoxybiphenyl. The final polymerization temperature was 320° C., and the yield of the light brown polymer was 0.72 grams. The IR of the polymer was identical to the one obtained in Example 6. The $T_g$ was found to be 96° C. as determined by DSC, but the polymer showed no melting point. The decomposition onset was found to be 404° C. under nitrogen atmosphere as measured by TGA.

COMPARATIVE EXAMPLE A

This comparative example shows that, while a polymer can be obtained by reacting CPP, monocarboxylic acid anhydride and dihydric phenol in a single step, the polymer obtained has a significantly lower glass transition temperature and darker color, and is obtained in lower yield than when a mixed anhydride of CPP and monocarboxylic acid is initially formed, and the isolated mixed anhydride subsequently polymerized with dihydric phenol.

In a 250 ml flask immersed in an oil bath and equipped with an argon inlet, reflux condenser, and mechanical stirrer were placed (a) 6.32 grams (20 mmol) of pure CPP, (b) 4.6 grams (20 mmol) of bisphenol A, (c) 0.05 grams of potassium acetate as a catalyst, and (d) 60 ml of acetic anhydride. The flask was degassed twice by vacuum-argon purge cycle, and the oil bath was heated to about 160° C. when the contents of the flask started to reflux. The refluxing was continued for about 20 minutes and after that time the apparatus was changed to a distillation set-up as in Example 1. The heating was resumed and excess acetic anhydride and acetic acid began distilling off. When the temperature reached 180° C., vacuum was applied slowly and the oil bath temperature was increased to about 250° C. in about 3½ hours. The bubbling syrupy polymer started to turn brown in color at which time the reaction was stopped. The flask was cooled and broken to obtain 3.43 grams of light brown polymer. Considerable amounts of CPP and bisphenol A sublimed on the walls of the flask and the condenser which was responsible for a much lower yield of the polymer than in Example 1. The condensate during the vacuum stage was found to be acetic acid by IR (2.04 grams). The IR spectrum of the polymer was identical to the one obtained in Example 1, the glass transition temperature was 59° C. and the melting point was 249° C. as determined by DSC. The decomposition onset under nitrogen was 371° C. as determined by TGA.

I claim:

1. A process for producing shapable aromatic polyesters derived from 1,3-bis(p-carboxyphenoxy)propane (CPP) and a dihydric phenol, comprising forming a mixed anhydride of CPP with a lower monocarboxylic acid containing at least 2 carbon atoms, and subsequently polymerizing said mixed anhydride with said dihydric phenol or a reactable diester of said dihydric phenol, to obtain said aromatic polyester.

2. The process of claim I wherein said mixed anhydride is prepared by reacting CPP with acetic anhydride.

3. The process of claim 1 wherein said mixed anhydride is prepared by reacting CPP with trifluoroacetic anhydride.

4. The process of claim 1 wherein said dihydric phenol is bisphenol A.

5. The process of claim 1 wherein said dihydric phenol is 4,4,'-biphenol.

6. The process of claim 1 wherein said reaction of mixed anhydride and dihydric phenol is carried out in the presence of an esterification catalyst.

7. The process of claim 6 wherein said catalyst comprises a basic potassium salt.

8. The process of claim 7 wherein said salt is potassium acetate.

9. A shapable aromatic polyester derived from 1,3-bis(p-carboxyphenoxy)propane (CPP) and a dihydric phenol said polyester having a glass transition temperature ($T_g$) of at least about 70° C. measured by differential scanning calorimetry at a 20° C./min heating rate.

10. The aromatic polyester of claim 9 having a glass transition temperature of about 90° to 220° C.

11. The aromatic polyester of claim 9 wherein said dihydric phenol is bisphenol A.

12. The aromatic polyester of claim 9 wherein said dihydric phenol is 4,4,'-biphenol.

* * * * *